US009400616B2

(12) United States Patent
Mies et al.

(10) Patent No.: US 9,400,616 B2
(45) Date of Patent: Jul. 26, 2016

(54) METHODOLOGY FOR MANIPULATION OF SATA DEVICE ACCESS CYCLES

(75) Inventors: Carl Joseph Mies, Costa Mesa, CA (US); Bruce Gregory Warren, Costa Mesa, CA (US); William Patrick Goodwin, Costa Mesa, CA (US); Lawrence Toshiyuki Shiihara, Costa Mesa, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 536 days.

(21) Appl. No.: 11/395,648

(22) Filed: Mar. 30, 2006

(65) Prior Publication Data

US 2008/0005410 A1    Jan. 3, 2008

(51) Int. Cl.
*G06F 13/372* (2006.01)
*G06F 3/06* (2006.01)

(52) U.S. Cl.
CPC .............. *G06F 3/0659* (2013.01); *G06F 3/067* (2013.01); *G06F 3/0614* (2013.01); *G06F 3/0658* (2013.01)

(58) Field of Classification Search
CPC ... G06F 3/0659; G06F 3/0614; G06F 3/0658; G06F 3/067
USPC .......................................................... 710/62
See application file for complete search history.

(56) References Cited

U.S. PATENT DOCUMENTS

| 5,991,851 | A  | * | 11/1999 | Alwais et al. ................. 711/106 |
| 6,119,183 | A  | * | 9/2000  | Briel et al. ..................... 710/316 |
| 6,289,406 | B1 | * | 9/2001  | Chambers et al. ............ 710/107 |
| 7,310,707 | B2 | * | 12/2007 | Olds et al. ..................... 711/133 |
| 2003/0046396 | A1 | * | 3/2003 | Richter et al. ................. 709/226 |
| 2004/0025052 | A1 | * | 2/2004 | Dickenson .................... 713/201 |
| 2005/0044281 | A1 | * | 2/2005 | McCarthy ......................... 710/5 |
| 2005/0228924 | A1 | * | 10/2005 | Marushak et al. ............ 710/300 |
| 2007/0088860 | A1 | * | 4/2007  | Chang et al. .................... 710/15 |
| 2007/0237174 | A1 | * | 10/2007 | Chang et al. ................... 370/467 |

* cited by examiner

*Primary Examiner* — Henry Tsai
*Assistant Examiner* — John Roche

(57) ABSTRACT

Controlling accesses to target devices such as disk drives by modifying the duty cycle profile of those devices to improve device reliability is disclosed. The utilization of a target device is monitored, and if a device is being overused, that device is given a rest period by reserving it for a special initiator that does not send any commands to the device for a certain period of time. This reduced utilization has the effect of increasing the reliability of the target device. This period of time also adds a delay to the processing of commands for the target device being overutilized so that the device becomes less responsive. This performance penalty creates pressure on system administrators to reduce the number of commands sent to that target device and/or move data to proper devices (that can handle the high number of accesses).

49 Claims, 9 Drawing Sheets

METHODOLOGY FOR MANIPULATION OF SATA DEVICE ACCESS CYCLES

FIELD OF THE INVENTION

This invention relates to the utilization and reliability of devices such as disk drives, and more particularly, to the use of affiliations or similar "reserve and release" mechanisms to create periods of inactivity for the devices to increase their reliability and encourage proper device usage.

BACKGROUND OF THE INVENTION

Conventional FC SANs. Fibre Channel (FC) is a serial transport protocol that was developed for carrying other transport protocols. In conventional Storage Area Networks (SANs), FC carries Small Computer System Interconnect (SCSI), which is a parallel protocol. In other words, parallel SCSI commands are encapsulated within FC frames and transported over FC links in FC SANs.

FIG. 1 illustrates an exemplary conventional SAN 100 which includes one or more hosts 102 connected to two Redundant Array of Independent Disks (RAID) controllers 104 over a network 106. The host side of the RAID controllers 104 is referred to as the "front end" 112. In conventional SANs 100, the RAID controllers 104 are connected to a plurality (e.g. 30 to 100) of drives in disk drive enclosures 108 and send and receive FC frames over a FC link 110. The disk drive enclosure side of the RAID controllers 104 is referred to as the "back end" 114. In conventional SANs 100, the disk drives within the disk drive enclosures are FC drives 118 that operate according to the SCSI protocol.

FC-ATA SANs. FC drives offer the best performance, but are expensive. Therefore, less expensive (but lower performance) Advanced Technology Attachment (ATA) drives of the type commonly used in desktop or notebook computers have been used in place of FC drives, or along with FC drives in what is referred to as tiered storage. The ATA drives may be Parallel Advanced Technology Attachment (PATA) or Serial Advanced Technology Attachment (SATA) drives. FIG. 1 illustrates a SAN in which one of the disk drive enclosures 108 contain PATA drives 120 rather than FC drives. PATA drives require a FC-to-PATA bridge 116, which is relatively expensive and effectively makes the PATA disk drives 120 appear as SCSI drives to the RAID controller 104. In other words, the RAID controllers 104 send FC encapsulated SCSI commands to the disk drive enclosures, and receive FC encapsulated SCSI commands from the disk drive enclosures, and the conversion between FC and PATA occurs in the bridge 116, transparent to the RAID controllers 104 and the rest of the SAN 100. Because PATA drives are different from FC drives in terms of interfaces, error recovery and discovery, FC-to-PATA bridges are designed to be specific to a particular type of PATA drive. As a consequence, every time a new PATA drive is developed, the FC-to-PATA bridge may require modification.

In disk drive technology, as well as in transport technology, there are speed and cable distance benefits to utilizing serial protocols rather than parallel protocols. SATA drives, the serial counterpart to PATA drives, are therefore now being contemplated as an upgrade to PATA. SATA was envisioned for consumer applications.

SAS-SATA SANs. FC, as described above, is a serial transport protocol that has historically been used for carrying the SCSI protocol in enterprise applications over large connectivity spaces. Serial Attached SCSI (SAS) is a relatively new serial protocol intended to replace parallel SCSI within an enterprise host or computer. Both FC and SAS use 8b10b encoding and similar ordered sets, and both are high performance and expensive. SAS includes several protocols. One such protocol is the Simple Management Protocol (SMP), a protocol for device-to-device management that enables each entity to communicate with other entities regarding management aspects.

To take advantage of lower cost SATA drives, SATA drives have been utilized alongside higher cost, higher performance SAS drives in SAS networks (a SAS network including the initiator, target, and any attached expander devices). As mentioned above, tiered storage is the concept of having different types of drives in the same network (e.g. some 73 GByte FC drives and some 200-500 GByte SATA drives), each for a different purpose. FIG. 2 illustrates a SAS SAN incorporating tiered storage, where SATA drives are utilized in addition to SAS drives. As illustrated in FIG. 2, within a host 200, a motherboard (MB) 202 includes a processor 204, an embedded SAS Input/Output Controller (IOC) 206, and a SAS expander 208 to provide multiple ports to the MB 202 and multiple connections to drives. Connected to the host 200 are SAS drives 210 and SATA drives 212 within the host 200. In addition, the host 200 is connected to enclosures 214 containing both SAS and SATA drives. To accommodate tiered storage, another protocol was developed within SAS, the SATA Tunneling Protocol (STP), which enables lower cost SATA drives to be employed in SAS systems.

Unlike FC, which is a loop technology where drives share a common infrastructure, SAS is a point-to-point technology. SAS employs a shared infrastructure with the ability to create a point-to-point connection between two devices through which data may be transferred without interruption. Similar to FC, SAS goes through a discovery process where the first SAS entity that is discovered is the SAS expander 208. The number of ports in the SAS expander 208 is also discovered. Each port is then discovered in turn by the initiator, and the device connected to each port is determined (e.g. a SAS device). For example, if a SAS discovery ordered set is sent to a SAS drive, the SAS drive returns an affirmative response indicating that it is a SAS drive. However, if the SAS ordered set is sent to a SATA drive, nothing is returned. Similarly, if a SATA discovery ordered set is sent to a SATA drive, the SATA drive returns an affirmative response, indicating that it is a SATA drive. From that point forward, the initiator communicates with the device as a SATA device.

In the simplified ladder diagram of FIG. 2 showing a half-duplex operation, SAS ordered sets are sent between the initiator 200 and the enclosure expander. The enclosure expander makes a connection between the initiator 200 and the correct target. Once the connection is created, SATA ordered sets 216 flow between a host or initiator 200 and a target 218. The SAS communications effectively build a point-to-point connection between the SAS IOC 206 and a target (e.g. SATA drive 212), and thereafter SATA ordered sets are passed across this connection that are natively understood by the SATA drive 212. Intermixed with the SATA ordered sets will be SATA File Information Structures (FISs) flowing from the initiator 200 to the target 218 (see reference character 220), and from the target 218 to the initiator 200 (see reference character 222) according to STP.

Because of the reliability, speed and cable distance benefits inherent in FC, and the lower cost of SATA drives, there was a need to utilize SATA drives in FC SANs that have historically utilized SCSI drives. Conventional solutions for utilizing SATA drives in FC SANs provided a conversion interface, or bridge, between the FC link and the SATA device. These conversion interfaces terminated all FC exchanges and initiated corresponding SATA exchanges at or near the targets. These bridging solutions required a bridge unit per SATA device or a bridge per SATA enclosure and as a result became a prohibitively expensive solution in a SAN environment. In addition, all error cases were dealt with at or near the drive level. In the other direction, SATA exchanges were also terminated and FC exchanges are created and sent to the FC initiator. Because the FC to SATA translation was performed independently at each SATA drive or enclosure, there was no clean way of performing this conversion and the approach was prone to performance and interoperability issues. Error recovery in FC is also much different than SATA. The interface had to deal with the differences, which added complexity and additional cost to the system.

Therefore, there was a need to be able to utilize SATA drives while preserving the FC infrastructure and FC transport to the greatest extent possible to minimize the changes needed to legacy FC SANs. There was a further need to move the translation and protocol handling into the RAID controllers, which is a much more cost effective solution because the RAID controllers can perform the protocol translation for a large number of drives.

FC-SATA SANs. FIG. 3 illustrates a SAN 300 including SATA drives and a conversion from FC to SATA that satisfied the needs described above. Such a system is described in further detail in U.S. patent application Ser. No. 11/104,341, filed on Apr. 11, 2005 and entitled "Method and Apparatus for SATA Tunneling Over Fibre Channel," the contents of which are incorporated herein by reference. In particular, FIG. 3 illustrates a system that encapsulates Serial Advanced Technology Attachment (SATA) Frame Information Structures (FISs) into Fibre Channel (FC) frames for transmission over FC SANs that utilize SATA disk drives.

When SCSI commands are to be sent from host 330 to SATA drives 342 in disk drive enclosure 332, a FC HBA 334 in host 330 sends FC frames encapsulating the SCSI commands out over the fabric 318 to a RAID controller 320, where they are received in one of the ports 336 on the RAID controller 320. Note that the ports 336 may also be connected to other hosts in the SAN 300. Note also that a RAID controller need not be employed, but rather any device providing an IOC function may be utilized. The FC frames are then routed to FC IOCs 322 in the RAID controller 320. The SCSI commands within the FC frames are then de-encapsulated by the FC IOCs 322 and passed over a Peripheral Component Interconnect (PCI) bus 324 to a processor 326, which performs the RAID function and creates multiple commands to satisfy the received SCSI command. The created commands may be SCSI commands or SATA commands and will be sent to one or more disk drives within enclosures 332.

The SCSI commands 306 are then passed from the processor 326 over a custom interface 328 (which may include, but is not limited to a PCI bus) to Fibre Channel Attached SATA Tunneling (FAST) enabled IOCs 304. The FAST IOCs 304 contain the same hardware as conventional FC IOCs, but include additional firmware 302 to allow it to handle both FC and SATA. SCSI commands 306 from processor 326 are converted in SCSI-to-SATA translation firmware 308 to SATA FISs. Alternatively, the SCSI-to-SATA translation may be performed by the processor 326 rather than in the FAST IOC 304. The SATA FISs are then encapsulated by FAST encapsulation firmware 312 into FC frames. In particular, each 8 kByte SATA FIS is encapsulated into four 2 kbyte FC frames along with modifications to the header in the FC frames that enable the SATA-encapsulated FC frames to traverse a FC link. The FAST IOC 304 then sends the FC frames out over a FC link 346 via a FC port 344.

The FC frames are received by FAST switches 340 in disk drive enclosures 332, which are utilized instead of FC-to-SATA bridges. Because FC-to-SATA bridges are no longer required, the problem of new SATA drive types requiring reworking the FC-to-SATA bridge disappears. The drives can be presented as pure ATA throughout the SAN, while using FC as the transport. The FAST switches 340 include a FAST engine 352, which de-encapsulates the FC frames to retrieve the SATA FISs, handles initialization, sequences, exchanges, and all of the low-level FC commands and structures. Note that conventional FC switches only route frames between the initiator and target (which handle all exchanges themselves). However, because SATA drives do not utilize the concept of exchanges, the FAST switches are responsible for creating and terminating exchanges. The de-encapsulated SATA FISs are then communicated over a pure SATA connection 348 to the SATA drives 342.

Note that the front end devices 350 and the SAN 300 are not aware of the existence of the back end devices 338. For example, when host 330 sends SCSI data to a particular logical drive, it acts as a front-end initiator and sends the FC-encapsulated SCSI data to a virtual address associated with one of the ports 336 and a FC IOC controller 322 connected to that port 336, which acts as a front-end target. Unknown to the host 330, the processor 326 performing the RAID function identifies multiple addresses in multiple disk drive enclosures 332, and sends the SCSI data to one or more FAST IOCs 304, which act as back-end initiators. The FAST IOCs 304 translate the SCSI data into SATA FISs, encapsulate the SATA FISs into FC frames, and send the FC frames to those multiple addresses in multiple disk drive enclosures 332, which act as back-end targets. This process is referred to as virtualizing the storage. The processor 326 maintains the association between the virtual address and the addresses in the multiple disk drive enclosures, so that when a request to read that data is received from the host 330, the data can be pulled out of the multiple disk drive enclosures and sent back to the host 330.

The reverse of the above-described process is employed when a SATA drive 342 sends SATA FISs back to the host 330. Thus, when SATA FISs are to be sent from a SATA drive 342 to the RAID controller 320, the SATA FISs are sent over the SATA connection 348 to the FAST switch 340, where it is encapsulated in FC frames. The FAST switch 340 then transmits the FC frames over the FC link 346 to the RAID controller 320, where they are received by the FAST IOC 304. The FAST IOC 304 receives the FC frames, de-encapsulates the frames to retrieve the SATA FISs, and performs a SATA to SCSI translation 308 so that the RAID controller will see the target drive 342 as a SCSI device. The SCSI commands are sent to the processor 326 over PCI bus 328, which performs the RAID function and identifies the hosts (initiators) for which the SCSI data is destined. The SCSI data is then sent to the FC IOCs 322 over PCI bus 324, where they are encapsulated into FC frames and sent to the appropriate hosts over the fabric 318. The hosts then de-encapsulate the FC frames to retrieve the SCSI commands.

The benefit of performing the encapsulation/de-encapsulation and the SATA/SCSI translation in the FAST IOC 304 is that other than the addition of the FAST IOC 304, legacy RAID controllers 320 need not be changed to support SATA commands. Because the FC infrastructure is a mature interconnection technology, the FC link 346 is retained between the RAID controller 320 and the multiple disk drive enclosures 332, even though the FC frames are now encapsulating SATA FISs. The conversion from SCSI to SATA could occur in the FAST IOCs 304 or in the processor 326. In either case, the FAST IOCs 304 would then communicate SATA FISs to the disk drive enclosures 332 over a pure FC connection. In general, the SCSI/SATA translation and FAST encapsulation could occur anywhere on the initiator side of a FC link, while the FAST de-encapsulation/encapsulation could occur anywhere on the target side of the FC link.

A primary difference between SAS-SATA SANs described above and the system of FIG. 3 is that in SAS-SATA SANs, there is a mixture of SATA FISs and SAS in the interconnect, while in FIG. 3, everything in the interconnect is FC. There are no SATA FISs, just FC frames with SATA FISs encapsulated within them.

Alternatively, a host may encapsulate SATA FISs in FC frames and pass these frames to a RAID controller, where the SATA FISs may either be de-encapsulated, virtualized and re-encapsulated into FC frames destined for multiple SATA drives in the back end, or simply passed through the RAID controller and sent directly to SATA drives through the FC network.

The FAST switch. FIG. 4 illustrates an exemplary FAST switch 400 resident in a FAST disk drive enclosure (not shown). The FAST switch 400 contains a number of FC Phy 402 and FC link layers 404 for interfacing with the FC ports on one or more RAID controllers over a FC link 404. The FC Phy 402 and FC link layers 404 handle all the primitives in FC. These layers monitor received FC primitives, modifying the active switch matrix connections in response to traffic going across the FC link. The FC link layers 404 are connected to a crossbar switch 406, which is also connected to a number of port link layers 408 for connecting to either a FC device or a SATA device. The crossbar switch 406 operates in FC Arbitrated Loop (FC_AL) space, and performs a switching function. It uses the FC Arbitrated Loop Physical Address (AL_PA) and OPeN (OPN) ordered sets to determine the destination of a connection request, and makes a connection across the crossbar switch to the target device.

Each port link layer 408 includes a FC/SATA link layer 410, a FC Tunneling SATA (FTS) layer 412, and a FC/SATA Phy 414. The FTS layer 412 contains logic which detects whether the port link layer 408 is connected to a SATA drive by detecting SATA ordered sets, and determines the status of the SATA drive. The FC/SATA Phy 414 are connected to SATA or FC drives 416.

Also connected to the crossbar switch 406 are FAST port/buffers 418 coupled to the crossbar switch 406 and one or more (e.g. four) FAST engines 420. The FAST engine 420 contains a full SATA core (and a Register Transfer Level (RTL) state machine) that understands the lower levels of the SATA protocol. The FAST engines 420 are viewed as initiators to the SATA drives 416. Note that because it would take up too much space to have a FAST engine and buffers for each port, a reduced number of FAST engines and buffers are shared between the port link layers 408. A small Ordered Set (OS) generation and detection circuit in the FC link layer 404 is used to keep the SATA drive interface serviced. The OS generator sends ALIGN characters to the SATA drive when not connected to the SATA link-layer in one of the FAST engine blocks. The detection circuit determines when the SATA drive is making a request that requires servicing by the SATA link-layer block in the FAST engine and passes the request to the router 422 to request a connection. The router 422 is connected to the crossbar switch 406 and makes routing decisions within the crossbar switch 406. Also connected to the crossbar switch 406 is an enclosure management function 424 controllable by a Central Processing Unit (CPU) port 426. The CPU port is a path to allow a processor to monitor FC frames locally.

To handle the FC protocol for the SATA targets, the FAST switch will take a FC address for each SATA device connected to a port (this would be an AL_PA for FC_AL topologies and a Destination IDentifier (D_ID) for Fabric or Point-point topologies) during the initialization sequence. The FAST engine will also respond to all Port LOGIns (PLOGIs) and PRocess LogIns (PRLIs) and will generate a Fabric LOGIn (FLOGI) if a fabric is present. The FAST engine knows from the presence of AL_PA 00 that a fabric is present. The logins will identify the targets as SATA devices. This allows a tunneling capable initiator to discover the devices and initiate a SATA connection to them. All non-ATA commands will be directed to the CPU port for analysis and response. Using the CPU port to process the FC login commands allows the flexibility of firmware to handle error and out of bound conditions.

The FAST port/buffers 418 are notified by the FAST engine 420 that there is an active SATA drive attached, and perform several functions. During FC loop initialization, the FAST port/buffers 418 take an AL_PA to reserve an address in the FC_AL subsystem. The FAST port/buffers 418 act as a FC target and receive FC primitives, OPNs, ARBitrates (ARBs), IDLEs, Loop Initialization Primitives (LIPs) and frames, and generate and send OPNs, ARBs, LIPs, and frames back to the initiator to make it appear to the FC port like a virtual disk drive. The FAST port/buffers 418 also terminate all FC frames coming across the FC link, handle all the FC protocols, and put the data into a First In First Out (FIFO) buffer for subsequent processing by the FAST engine 420. The FAST port/buffers 418 can also be statically configured by setting a bit to support either standard FC or SATA-encapsulated FC frames, and thus can be connected to either FC or SATA drives. The FAST port/buffers 418 also have buffers to translate from FC speeds to SATA speeds and perform speed matching with the drives.

SATA supports up to an 8 k frame size. In order to transfer the SATA frames through FC environment, the SATA frames must be divided into the negotiated FC frame size. This is accomplished by filling a FC buffer in the FAST port/buffers 418 and then sending a HOLD to the SATA target until another FC buffer is available. When the FC buffer is available, the HOLD is released and additional data is received from the SATA device. This facility requires that the FAST switch increment the SEQuence IDentifier (SEQ_ID) on each frame of a response to detect out of order and lost frame tracking by the initiator. When data is being received on the FC side destined for the SATA device, the data will come in as the negotiated frame size where it will be assembled into the proper SATA frame sizes. If the entire SATA frame is not available to send to the target, a HOLD is sent to the target until the next frame is received from FC interface or the last sequence of the exchange is received.

The FAST engines 420 emulate the host initiator to the SATA drive 416, and take the data out of the FIFO buffer (in the case of data going from the initiator to the SATA drive). The FAST engines 420 also check incoming frames to determine if they are valid SATA frames to be passed on to the SATA drive 416, if it is a PLOGI frame that needs to be responded to (low level responses) without involvement of the driver, or if it is a frame that the FAST engine does not recognize and must send to the CPU port for the processor to handle on an exception basis.

When a SATA drive 416 is ready to transfer data, the SATA drive sends a Transmit (Tx) Receiver ReaDY (R_RDY) ordered set to the port link layer 408, indicating that data is ready to be transferred. However, if the FAST switch is not ready to receive the data because no FAST engine 420 is available, for example, the FTS 412 detects this condition and continues to send an idle character to the SATA drive, which will not start sending data until R_RDY ordered sets are sent, signaling it is okay to start transmitting data back to the FAST switch. When a FAST engine 420 becomes available, the FTS 412 sends a routing request to the router 422 (who knows from the discovery process that the requestor is a SATA drive 416), requesting that the SATA drive be connected to a FAST engine 420. When a FAST engine 420 is assigned, the FAST engine becomes the initiator to the SATA drive (the target). Because SATA is a point-to-point protocol, SATA believes there is only the initiator and the target, nothing else. In effect, there is no addressing, because none is needed.

Affiliations. SATA targets are designed to be controlled by a single initiator. In order to use these devices in a multi-initiator environment, an affiliation method is deployed. The affiliation method provides a reserve and release control mechanism to ensure non-queueable commands from multiple initiators do not collide. Prior to issuing a non-queueable command, an initiator must request and be granted an affiliation with the desired SATA target. Only after being granted an affiliation may an initiator issue a non-queueable command to a SATA drive.

Affiliations can be used in loop and fabric environments. The initiator first sends an affiliation frame to the target. The FAST switch receives this frame and, assuming the disk is available, generates a response frame granting the affiliation to the initiator. If the disk is unavailable, either by being already in an affiliation or processing queueable commands, the FAST switch may queue up the affiliation request, to be processed when the disk is available or immediately generate an affiliation not available response.

Once the point-to-point connection is made, the FAST engine 420 is responsible for accepting the responses from the SATA drive 416, performing all the handshaking with the SATA drive, encapsulating the received data (e.g. data in response to a read request) into FC frames along with the proper context for the response, and storing the encapsulated FC frames into the FAST port/buffers 418. The FAST engine 420 tracks that the request came in from a particular device with a particular OXID, Source Identifier (S_ID) and D_ID. The FAST engine 420 utilizes this context information to build FC frames, move completed FC frames (having the SATA FIS encapsulated within) to the FAST port/buffers 418 and ensure that the response is sent to the right place, using the correct exchange, and in the proper sequence. The SATA core in the FAST engine 420 is also responsible for telling the drive 416 to hold off if the FAST port/buffers 418 are full.

When multiple FC frames have been built and stored in the FAST port/buffers 418, and either all buffers are full or the SATA response is complete and a complete exchange is stored, the buffer state machine makes a routing request to the router 422, who has access to the context of the response and knows who the initiator is, to route the FC frames out of a FC Phy 402 connected to the initiator.

The FAST engines are also used in a similar manner to fill the frames for write commands to the SATA drives.

When the current initiator is finished sending requests, a close affiliation frame is sent to the FAST switch which removes the affiliation at the completion of all pending I/Os. The tunnel device then sends an affiliation removal accept following the completion of the last outstanding I/O. Affiliations may also be closed by the FAST switch, to facilitate fairness between the multiple initiators. To close an affiliation, the FAST switch generates an affiliation close frame to the initiator if it desires to close the affiliation and allow another initiator access to the target. Upon receipt of the affiliation close, the initiator normally stops sending I/O requests and forwards an affiliation close accept frame. The initiator could reject the affiliation close request from the switch, keeping the affiliation active if the initiator so desires.

FAST engines. FIG. 5 illustrates an exemplary FAST engine 500. In FIG. 5, the FC Receiver (Rx) frame decoder/router 502 checks received frames and dispositions them as described above. The FC Rx frame decoder/router 502 checks the frame R_CTL and Type fields to determine where to route the received frame. Routing of all frame types may be selectable via hardware registers to allow hardware generated responses, routing tunneled frames to the SATA IP core 510 or firmware processing via a SATA processor port.

If the frame is a valid SATA-encapsulated FC frame to pass on to a SATA drive, the frame is sent to the Tx FAST Link/Transport Layer block 504, where it is processed at a higher level to set up an active exchange between the host initiator and the virtual target. The Tx FAST Link/Transport Layer block 504 also de-encapsulates the FC frame and strips off and maintains the context information, and sends the SATA FISs to the SATA IP interface block 508 and a SATA IP core 510. The SATA IP interface block 508 contains any glue logic required to tie the SATA IP core 510 into the design. Among features supported is resetting targets on non-stealth LIPs, aborting the transmit requests on errors, etc. The SATA IP core 510 contains the physical and link layer logic for interfacing to SATA devices, sorts the SATA ordered sets, makes sure the spacing between frames is correct, and processes holds and hold acknowledgements and other low level SATA protocols.

The hardware response manager block 514 offloads the FAST switch's local processor by generating response frames to many FC commands. Unrecognized frames are routed through the CPU port to the local processor to be resolved. This block will respond to at least the frames listed below:

| IOC-Generated Frames | FAST Engine Response Frames |
|---|---|
| FLOGI | LS_ACC (Class 3 info only) |
| PLOGI | LS_ACC (Class 3 info only) |
| PRLI | LS_ACC (Type code is TBD) |
| Command w/o available affiliation | P_RJT/F_RJT (Port busy, reason is N_PORT busy) |
| Command not supported | P_RJT/F_RJT () |

Transaction specific fields (D_ID, S_ID, OXID, etc) are read from all received frames to allow insertion in the proper fields of the response frame. A response frame request may be generated by either the FC Rx frame decoder/router 502 as a canned response to a known received frame type or by the affiliation and command queue manager block 516 to indicate busy conditions. While each FAST engine contains its own Hardware Response Block control circuitry, the data for these frames is held in a module shared by all the FAST engines to save gates. Note that only a small number of FAST engines are used to save gates. Because the router connects requests to/from SATA ports on a first-come, first-served basis, the FAST engine associated with a particular request probably will not be the port that the response is returned through. Thus, a shared context table must be maintained so all FAST engines can correctly store and/or generate the appropriate headers for the FC frames.

When a response is returned from the SATA drive, the context can be associated with the return data so that it can be routed back through the FC fabric to the initiator. In other words, the Tx FAST Link/Transport Layer block 504 opens the FC exchange structure and keeps track of the context of all frames being sent to the drives, so that when a response comes back from a drive, the Tx FAST Link/Transport Layer block 504 can put the context back into the FC frame wrapper. Tx FAST Link/Transport Layer block 504 monitors the received FC frames, and after verifying a valid Cyclic Redundancy Check (CRC) on the frame, the logic accesses the affiliation and command queue manager block 516 to determine if an affiliation already exists with the targeted SATA drive. If an affiliation exists and the frame is part of a transaction within the existing affiliation the frame is forwarded to the disk. If the frame is not from an initiator affiliated with the disk, the frame is buffered within the FAST switch until the affiliation is closed and the disk is available to receive the command. Note: Only non-queueable command FISs must be protected within the affiliation mechanism, queueable command FISs do not require affiliations.

The logic verifies the received frame is the next frame in the sequence. If so, the frame is passed to the SATA IP interface 508 to be forwarded on to the target device, and the status of the transaction is sent to the affiliation and command queue manager block 516 to update the database. Because FAST protocol engines 500 are dynamically assigned, transaction information that spans more than one frame is passed through the affiliation and command queue manager 516 for storage in the shared database, accessible by all FAST engines. If the received FAST frame is not the next frame in the sequence, the frame is discarded.

In the case of a write, once all the data has been written to the SATA drive, the SATA drive sends a "status good" response through the SATA IP core 510 and the SATA IP interface 508 back to the Rx FAST link/transport layer 506, which retrieves the context information and sends it out through the FC Tx frame multiplexer 512 as a FC frame back to the host, indicating to the host that the write is complete. The stored FC fields are used to generate the FC frame. The module also checks and generates Cyclic Redundancy Checks (CRCs) as part of receive/retag operation. If a bad CRC is received from the disk, the CRC generator will generate a bad CRC, passing the error handling responsibility up to host.

The Tx FAST Link/Transport layer block 506 and FC Tx frame mux blocks can also detect corrupted frames and pass them to a local processor to handle as an exception, and the local processor can send frames down to the SATA as needed to do some background work.

The FC TX Mux block 518 selects between the various sources of data to send the desired data to the FAST Port interface.

Overuse of SATA drives. FC disk drives are designed for continuous use and are capable of being accessed at full capacity 24 hours a day, seven days a week. SATA disk drives, on the other hand, were designed for less intense use (on the order of eight hours per day, five days per week) in desktop computers. These SATA devices are not expected to be running thousands of I/O Per Second (IOPS) for days at a time.

Because of their low cost, SATA devices are starting to be used in enterprise systems. Some SATA disk drives are being used in near-line applications as backup storage to high-speed, high-quality enterprise-level disk drives for day-to-day transactions, where they are written to or read from relatively infrequently, an amount of use that is consistent with their designed purpose.

However, SATA devices are also now being used in systems where access to the SATA devices is relatively continuous, where data is written or read to a SATA disk drive 24 hours a day, seven days a week. However, in enterprise systems where the SATA devices are accessed with these FC device duty cycle profiles, the SATA devices are having higher than expected failure rates because SATA devices were not designed to operate with this access profile. For example, the read/write heads or rotors may fail. Existing bridge products do nothing to limit the access to SATA devices and instead allow the devices to be over-utilized.

Tracking usage of drives. Generally, some short time periods of high access to a disk drive are to be expected, such as when near-line backups or snapshots are being performed. However, longer time periods of high access should be avoided. A feature currently implemented in Emulex Corporation's Inspeed® products is a drive utilization monitor, which is used to monitor usage of a drive and detect overuse of drives. This drive utilization monitor is described in U.S. Published Application No. 2004/0081186A1, published on Apr. 29, 2004 and entitled "Methods and Apparatus for Switching Fibre Channel Arbitrated Loop Devices," the contents of which are incorporated by reference herein. The drive utilization monitor may track the total time that frames of data are being written to or read from a drive or the time a drive is connected to a port. If overuse is detected, a RAID controller or management utility may be notified.

Need for invention. Although device utilization can be monitored, users have had no direct method of controlling and limiting device access. Therefore, there is a present need to limit the access to devices by measuring device usage, determining if it exceeds certain thresholds, and reducing the device usage until usage levels drop below the usage thresholds. There is also a need to queue commands received during a device's "rest" period to minimize impact on the system. There is a further need to encourage system administrators to correct persistent device overuse. There is also a need to modify the access profile of a device while remaining transparent to the higher level RAID implementations.

SUMMARY OF THE INVENTION

Embodiments of the present invention are directed to controlling accesses to target devices such as disk drives by modifying the duty cycle profile of those devices to improve device reliability. The utilization of a target device is monitored, and if a device is being overused, that device is given a rest period by reserving it for a special initiator that does not send any commands to the device for a certain period of time. This reduced utilization has the effect of increasing the reliability of the target device. This period of time also adds a delay to the processing of commands for the target device being overutilized so that the device becomes less responsive. This performance penalty creates pressure on system administrators to reduce the number of commands sent to that target device and/or move data to proper devices (that can handle the high number of accesses).

A system administrator may initially set various utilization parameters, such as a utilization threshold (e.g. in IOPS) and the permissible duration for which a target device may exceed the utilization threshold. Different utilization parameters may be stored for different target device types (e.g. FC and SATA) or even individual devices as determined by their addresses. Firmware in a switch monitors the activity to some or all of the target devices. When the firmware determines that a target device is being overused, the firmware may set a register bit or other indicator, requesting that the device be reserved for a CPU port, which acts as a special-case initiator. All I/O commands pending in the queue of target device are allowed to complete before the reservation request is granted. During the time that the target device has been reserved for the CPU port, the CPU port remains idle (i.e. sends no commands), and thus the device is also idle during this time. This period of rest improves the reliability of the target device.

During this period of rest, requests from other initiators are not forwarded to the target device. Instead, all subsequent I/O commands to the target device go through a crossbar in the switch to an available protocol engine for processing. The protocol engine then sends a command to a shared context engine, inquiring whether the target device is available. If the shared context engine indicates that the target device is not available (e.g. it is currently reserved to another initiator such as the CPU), the protocol engine sends a command to the shared context engine to store the I/O command in a queue located in RAM. If all queue locations become filled, the protocol engine returns a "busy" indication to the initiator(s).

This buffering will cause latency (an increase in response times) in the processing of the queued commands from the other initiators, which is generally undesirable. This degraded performance creates back pressure on system administrators to not utilize the target device in a manner for which it was not intended. When a programmable time period elapses, the reservation with the target device is canceled, and the shared context engine may send a request to the protocol engine to forward the next available queued I/O command to the drive. In this manner, all I/O commands from other initiators that have been stored in queue may thereafter be processed, and normal command activity resumes.

Reservations of the target device to the special-case CPU port initiator and the resultant periods of inactivity may be repeated over time until the usage levels for the device drop back down below the desired utilization thresholds. Initially, a target device may be reserved for a predetermined rest period, based on actual utilization data and/or how long the device has been exceeding the permissible utilization thresholds. After the predetermined rest period has elapsed, the target device reservation is canceled. At this point, some or all of the buffered commands from other initiators stored in queue are processed, and utilization levels may be re-measured. The re-measured utilization levels may not only consider gathered utilization data, but may also consider the number of commands that were buffered at the time the target device reservation was canceled, which is also an indication of the utilization levels of the device. If the measured utilization levels are still too high, another target device reservation may be requested, perhaps for a shorter time if utilization is improving. As utilization levels drop closer to permissible levels, the reservation rest periods may shrink. Eventually, utilization levels may fall below the programmable thresholds, in which case no further target device reservations will be requested.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the present invention are directed to controlling accesses to target devices such as disk drives by modifying the duty cycle profile of those devices to improve device reliability. The utilization of a target device is monitored, and if a device is being overused, that device is given a rest period by reserving it for a special initiator that does not send any commands to the device for a certain period of time. This period of time adds a delay to the processing of I/O commands for the target device being overutilized so that the device becomes less responsive. The system maintains access to the target device, but with degraded performance in an attempt to reduce the device's overall utilization and achieve the device's desired usage profile. This reduced utilization has the effect of increasing the reliability of the target device while decreasing the IOPS to the device, and with this penalty, creates pressure on the system administrators to reduce the number of I/Os sent to that device and/or move data to proper devices (that can handle the high number of accesses). Another advantage of reduced utilization is that it reduces power consumption and heat, which also affect reliability.

Although embodiments of the present invention are generally described and illustrated herein with respect to SATA devices, and in particular, SATA disk drives and the SATA affiliation mechanism (i.e. the SATA reservation mechanism), it should be understood that embodiments of the present invention are generally applicable to other types of devices and protocols such as FC devices, SAS/SATA systems and the SATA Tunneling Protocol (STP), and iSCSI, and their corresponding reservation mechanisms.

Figure 4:
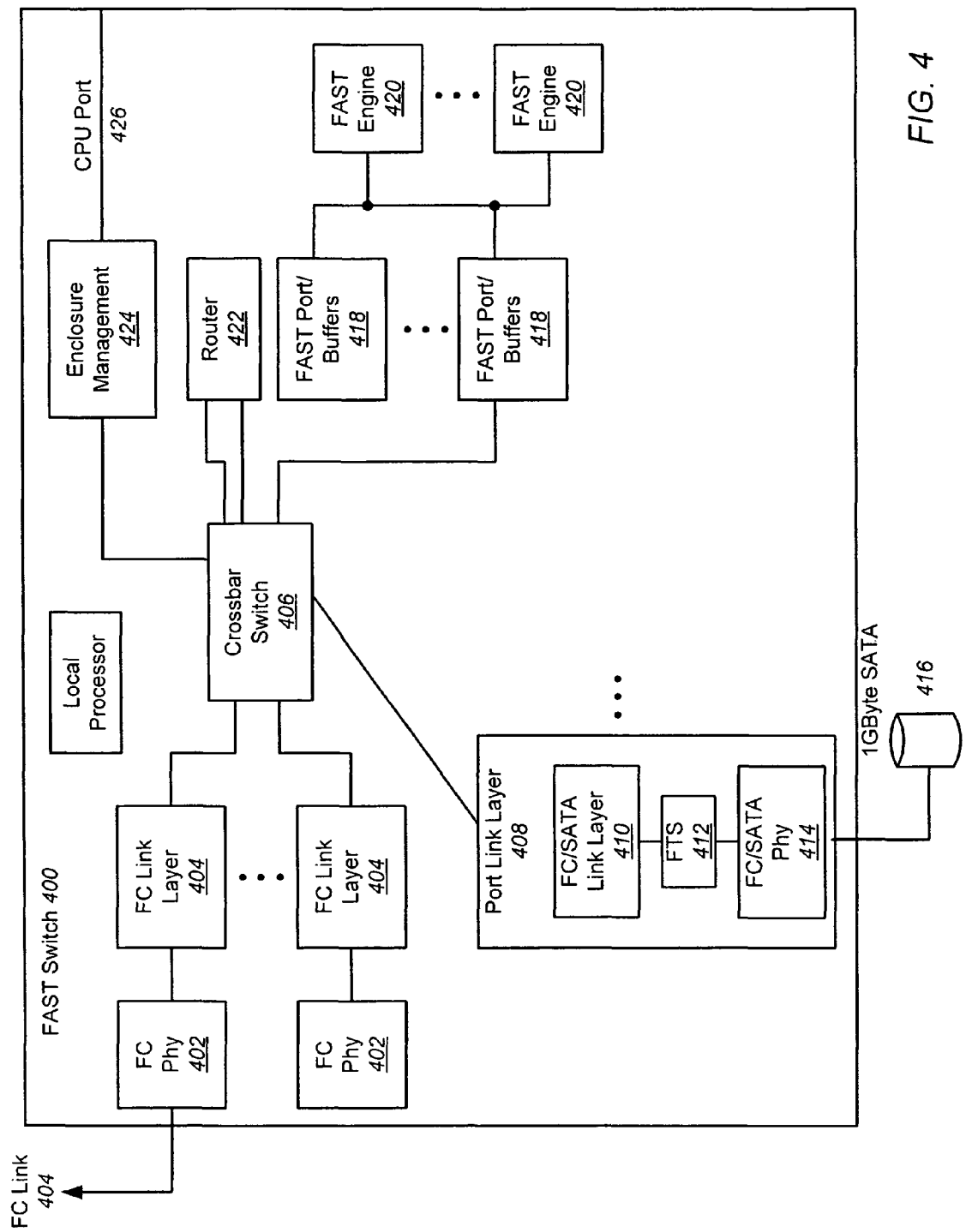
FIG. 4 is an illustration of an exemplary FAST switch that may be resident in a FAST disk drive enclosure.
Figure 5:
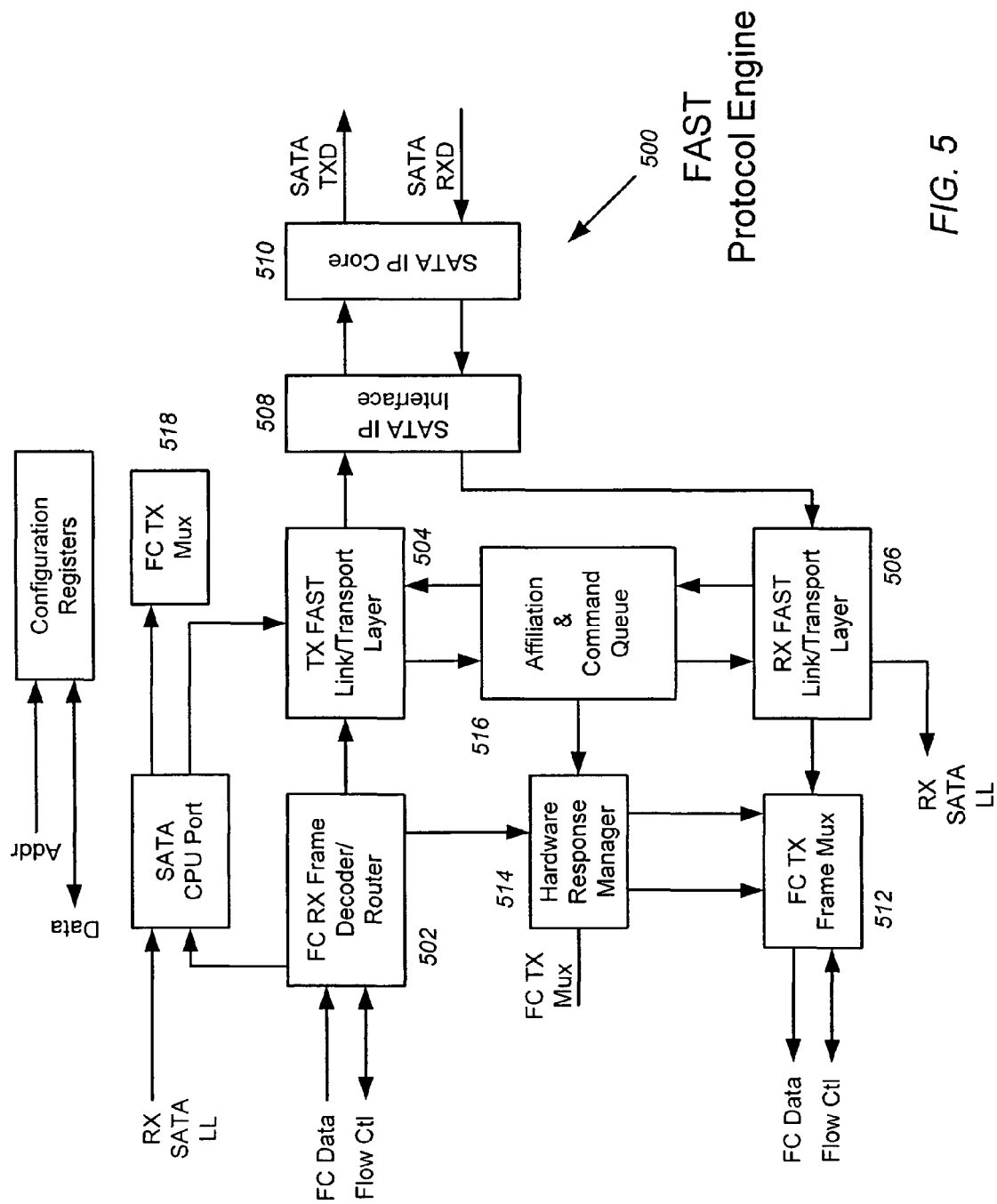
FIG. 5 is an illustration of an exemplary FAST engine.
Figure 6:
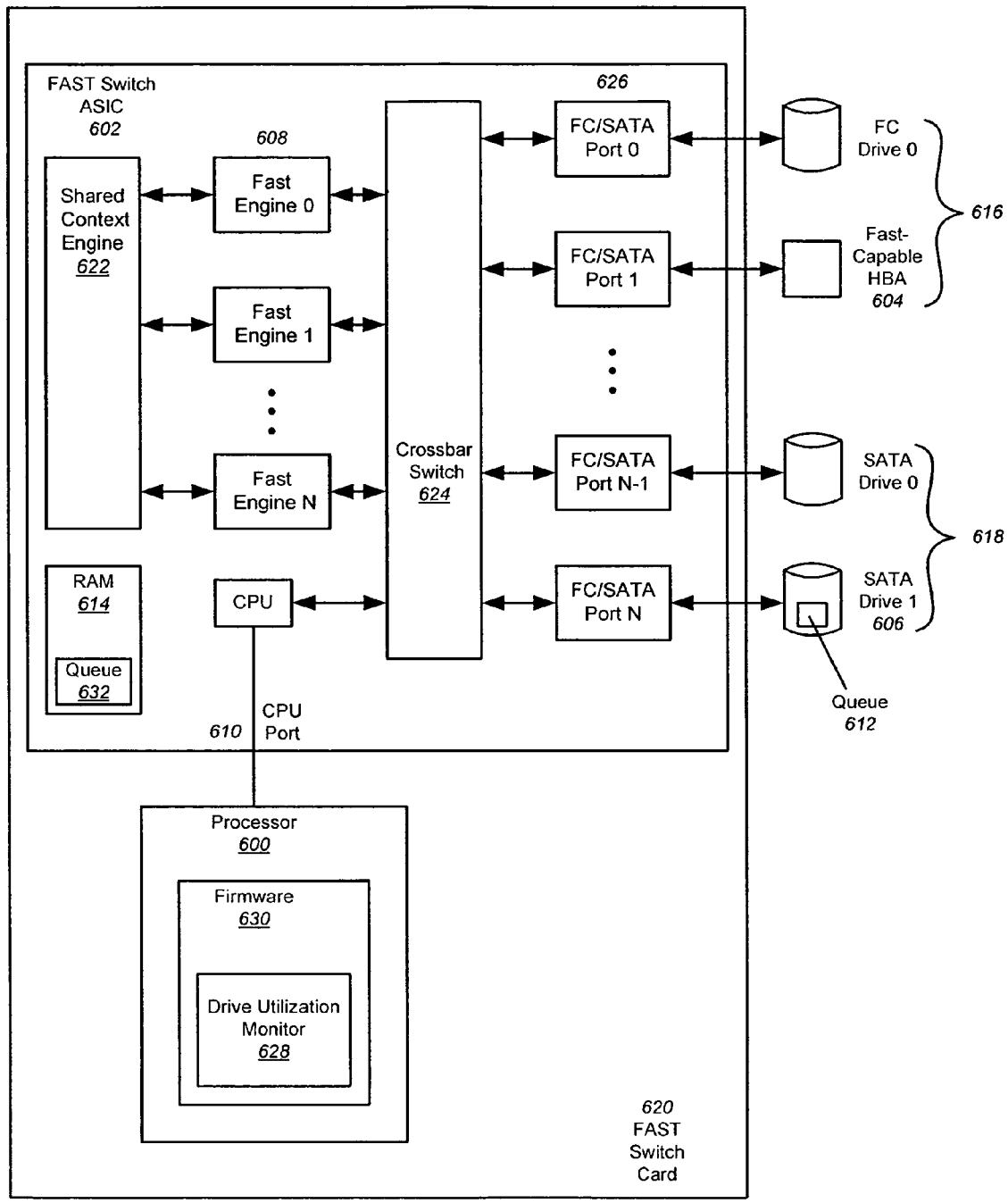
FIG. 6 is an illustration of an exemplary FAST switch card connected to various initiators and targets for implementing SATA drive access control according to embodiments of the present invention.

FIG. 6 is an illustration of an exemplary FAST switch card 620 connected to various initiators and targets for implementing SATA drive access control according to embodiments of the present invention. Referring again to FIG. 6, the FAST switch card 620 may include a FAST switch ASIC 602, external processor 600, RAM 614, and a shared context engine 622. The FAST switch ASIC 602 may include a CPU port 610, a crossbar switch 624, a plurality of FAST engines 608, and a plurality of FC/SATA ports 626, each port capable of being connected to an initiator or target. Note that FAST switch ASIC 602 corresponds to the exemplary FAST switch 400 illustrated in FIG. 4.

Figure 1:
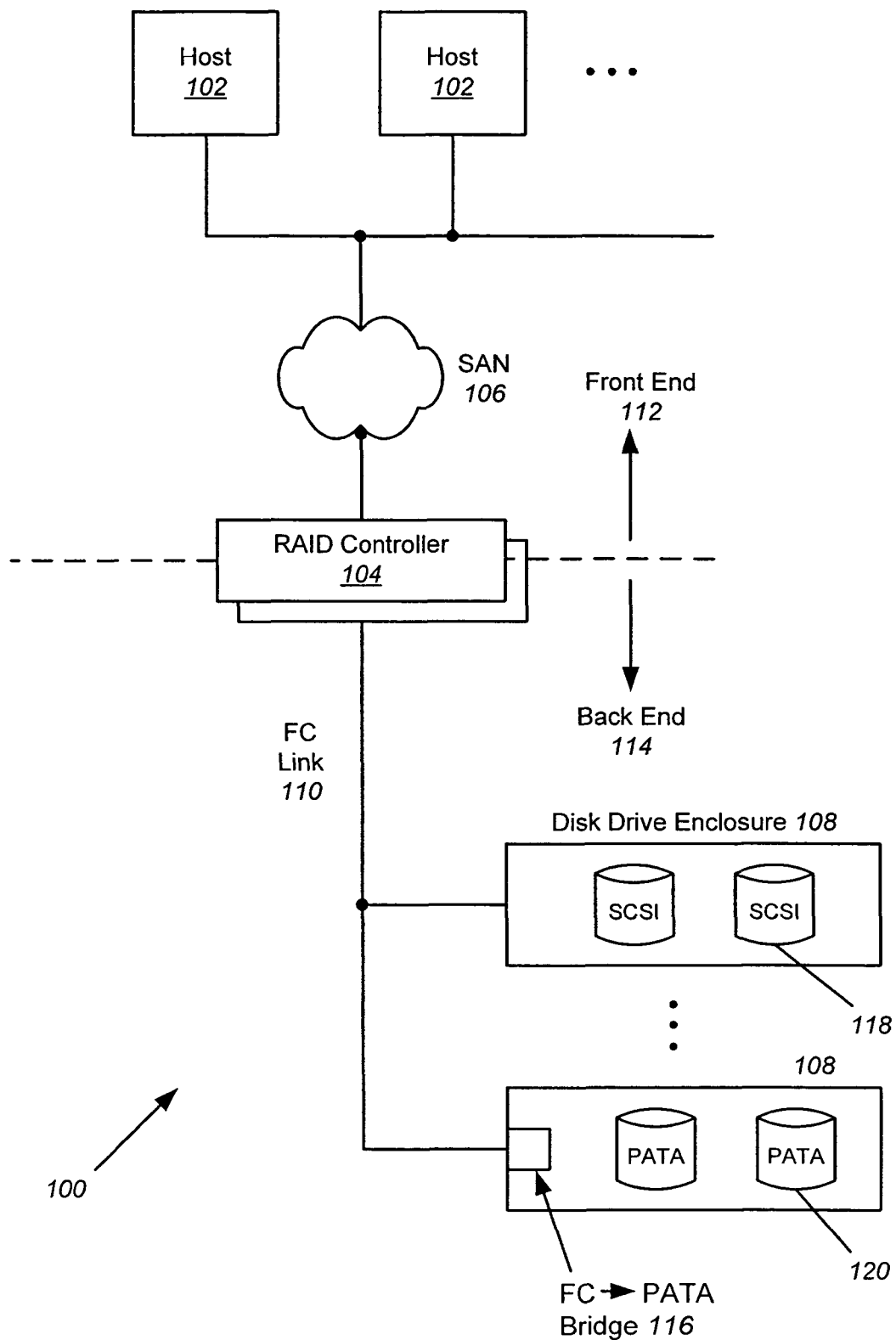
FIG. 1 is an illustration of an exemplary SAN including one or more hosts connected to two RAID controllers and two disk drive enclosures over a network, with one of the enclosures including a FC-to-PATA bridge.
Figure 2:
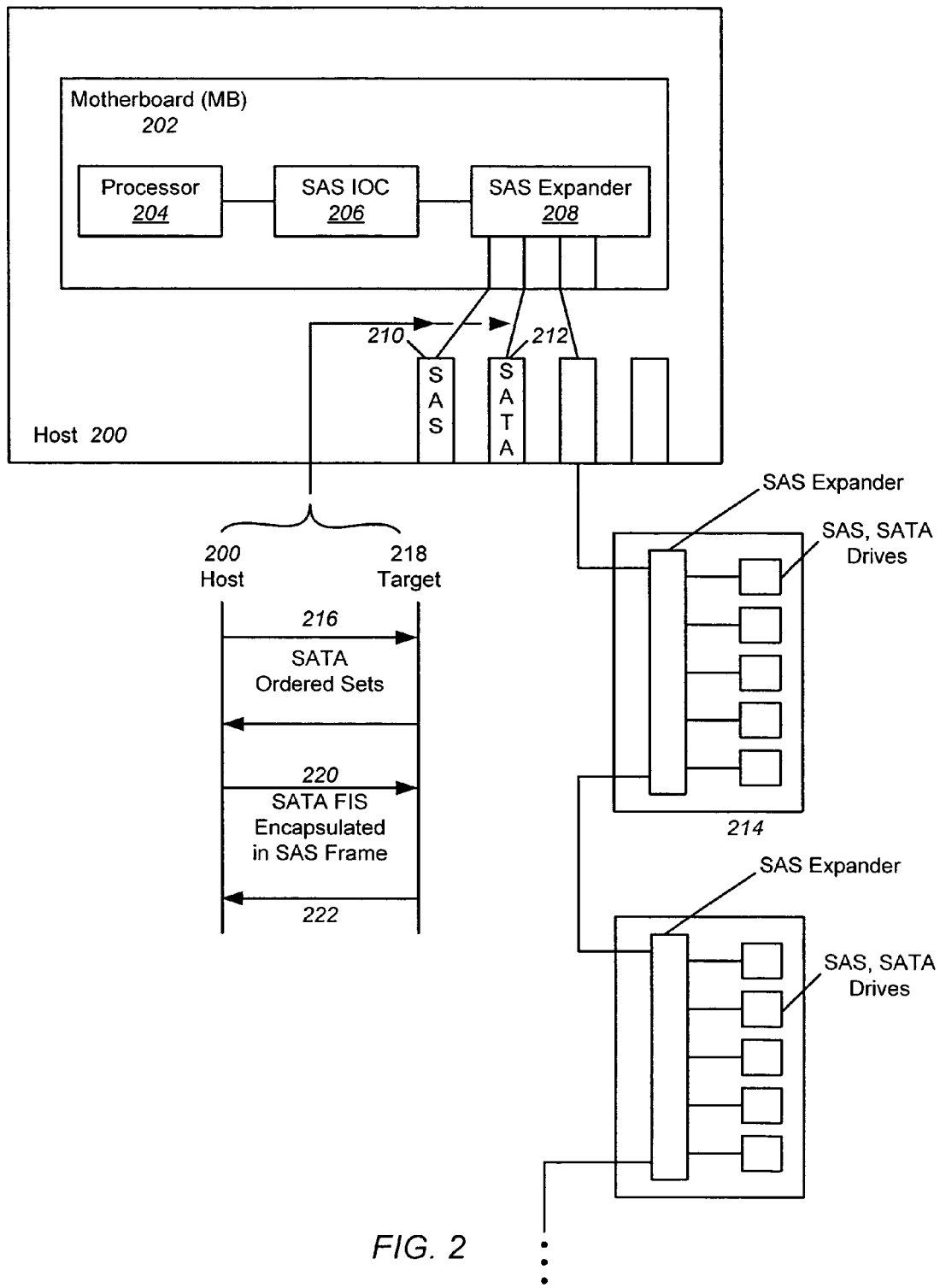
FIG. 2 is an illustration of an exemplary SAS network within a host incorporating tiered storage, where SATA drives are utilized in addition to SAS drives.
Figure 3:
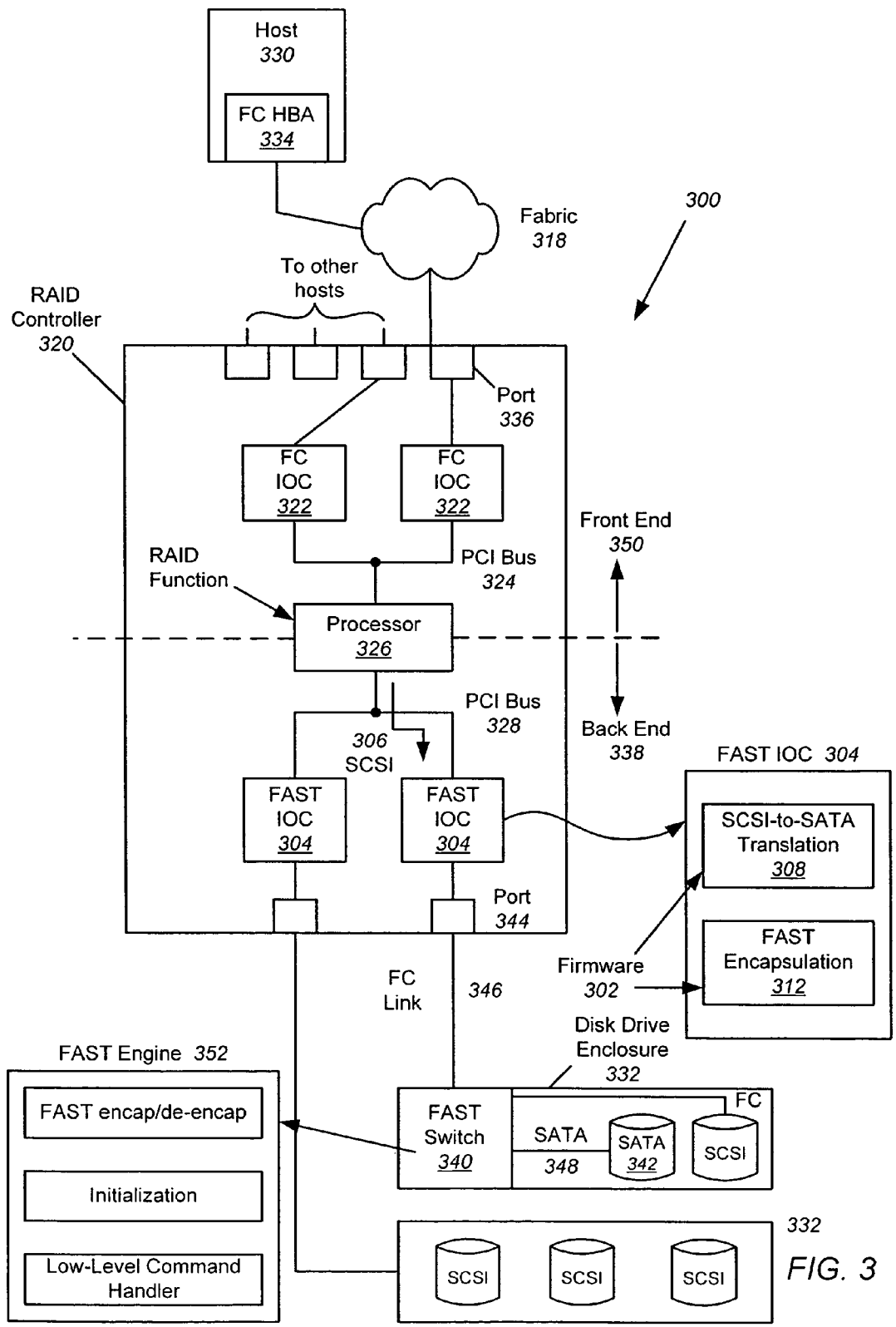
FIG. 3 is an illustration of an exemplary SAN including a host, a RAID controller including a FAST IOC, and a disk drive enclosure containing SATA drives and a FAST switch.

In the example of FIG. 6, an initiator (FAST-capable HBA 604) is connected to FC/SATA port 1, and a target (SATA disk drive 1) is connected to FC/SATA port N. It should be understood that for purposes of placing the FAST switch card 620, initiators and targets of FIG. 6 into their proper system-level context of FIG. 3, the FAST switch card 620 correlates to the FAST switch 340, the initiator may correlate to FAST IOC 304, and the target may correlate to SATA drive 342. A drive utilization monitor 628 running in processor 600 allows a user to program particular overuse parameters, which may include a level of utilization threshold, the duration that the level of utilization can exceed the threshold before overuse is declared, and the actual magnitude of the overuse. It should be further understood that the functional blocks of FIG. 6 may be physically arranged in a number of hardware configurations, and are not limited to the hardware configuration of FIG. 6.

Figure 7:
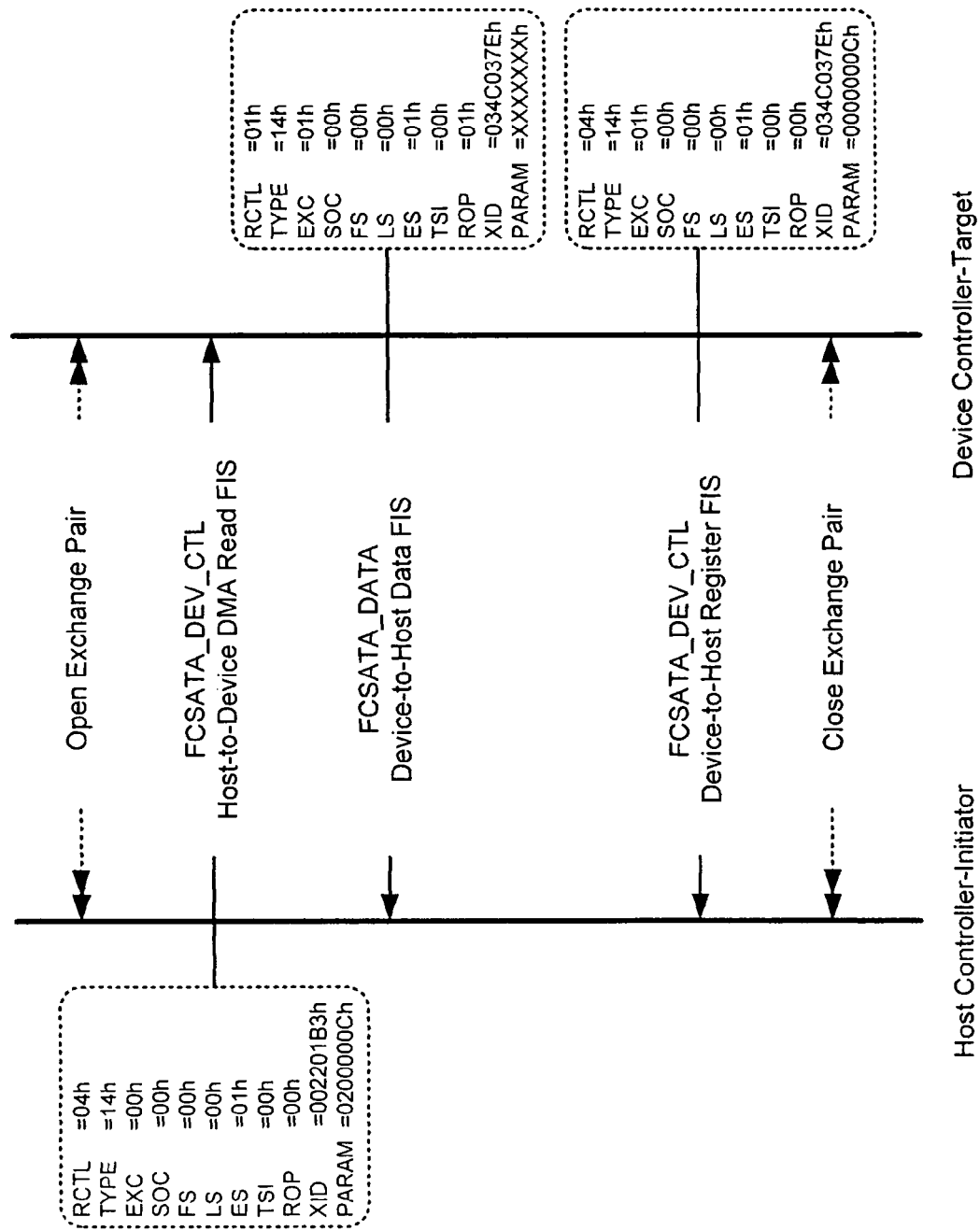
FIG. 7 is an illustration of a DMA read operation sequence diagram.

SATA commands can be queueable or non-queueable. Queueable commands are the most common type of command, and can be further characterized as either non-affiliated (more common) or affiliated queueable command sequences. In conventional SATA systems, non-affiliated queueable commands from a single initiator to a target may be placed in a queue for subsequent processing and do not require an affiliation to be established. With these read and write operations, traffic is similar to the Direct Memory Access (DMA) read operation sequence diagram illustrated in FIG. 7.

In some instances, however, an initiator may want sole access to a target so that it can send multiple read or write commands to that target. In such a case, an affiliation request will be sent from the initiator, and an affiliation will be created as described above, reserving the target for the initiator so that the initiator can thereafter send multiple queueable commands to that target and receive responses from that target. After an affiliation has been established with a particular initiator, any commands from any other initiator that are received after the affiliation is formed are held in a buffer, to be completed after the affiliation is released or terminated, albeit with some delay or latency. Alternately, in the absence of buffer space, commands from any other initiator may be responded to with a status of device busy, requiring the initiator to resend the command(s).

In FAST-compatible systems such as the one shown in FIG. 6, multiple initiators (including HBA 604) may send SATA I/O commands to a target (e.g. SATA disk drive 1). Non-affiliated queueable commands from multiple initiators to a target may be placed in a queue for subsequent processing, and in most cases do not require an affiliation to be established.

Figure 8:
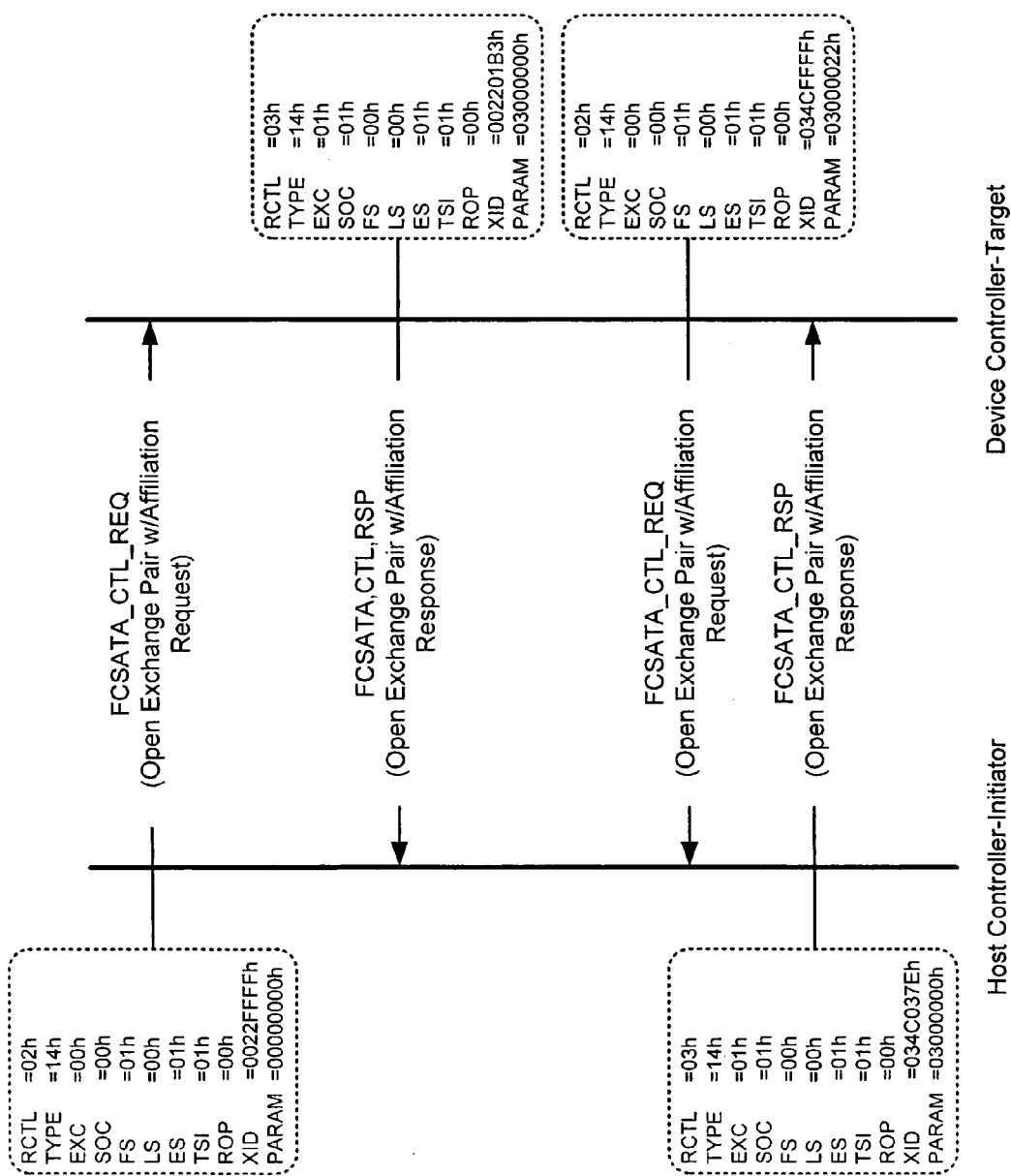
FIG. 8 is an illustration of an exemplary ladder diagram of an initiator requesting an affiliation with a target.

However, as in conventional SATA systems, initiators in FAST-compatible systems may also want sole access to a target so that it can send multiple read or write commands to that target. In the exemplary FAST-compatible environment of FIG. 6 that supports both FC devices 616 and SATA devices 618, the initiators can get this dedicated access by requesting an affiliation as described above. FIG. 8 illustrates a ladder diagram of an initiator requesting an affiliation with a target.

Referring again to FIG. 6, suppose that HBA 604 wants to have sole access to SATA drive 606, but that other initiators have already sent out queueable commands for that SATA drive. To obtain this sole access, HBA 604 will request an affiliation with a SATA drive 606. When HBA 604 requests an affiliation with SATA drive 606, a free FAST engine 608 receives and queues up the request, and after all pending I/O commands queued in the SATA drive queue 612 are processed, an affiliation is then made between the initiator and the SATA drive.

Non-queueable commands, as the name implies, cannot be placed in a queue. When a target sees a non-queueable command, it discards all queued commands and processes the non-queueable command. This is appropriate in the conventional single initiator environment, where the initiator will knowingly send a non-queueable command with the understanding that any presently queued commands will be lost. However, this is not appropriate in a multi-initiator environment (such as a FAST-compatible system), where the queued commands of one initiator may be discarded without notification to give way to the non-queueable command of another initiator. FAST-compatible systems avoid discarding previously queued commands from other initiators by allowing all previously queued commands to complete before creating an affiliation with the target to process the non-queueable command. After an affiliation has been established with a particular initiator to service the non-queueable command, any commands from any other initiator that are subsequently received after the affiliation is formed are held in a buffer, to be completed after the affiliation is released or terminated, albeit with some delay or latency.

As mentioned above, embodiments of the present invention utilize the affiliation mechanism available for SATA devices to create a "rest" period for the SATA drive when overutilization is detected. Referring to the example of FIG. 6, a system administrator may initially set various utilization parameters in firmware executed by processor 600, such as a utilization threshold (e.g. in IOPS) and the permissible duration for which a device may exceed the utilization threshold. Different utilization parameters may be stored for different device types (e.g. FC and SATA) or even individual drives as determined by their addresses.

The FAST switch card 620 may initially operate within expected parameters, with a normal level of FC-SATA traffic flowing between initiators and SATA devices. During this time, FAST switch card firmware 630 (including drive utilization monitor 628) running in processor 600 monitors the activity to some or all of the devices and detected devices that are being overutilized. For example, when the firmware 630 determines that SATA drive 1 is being overused, the firmware may set a register bit or other indicator, requesting that CPU port 610 create an affiliation between the CPU port 610 and SATA drive 1. At this time, all I/O commands pending in the queue 612 of SATA drive 1 are allowed to complete before the affiliation request is granted.

During the time that an affiliation has been formed between the CPU port 610 and SATA drive 1, the CPU port has the role of an initiator. However, unlike most initiators, the CPU port 610 will remain idle (i.e. will send no commands) during this time, and thus SATA drive 1 is also idle during this time. This period of rest improves the reliability of the SATA drive.

During this period of rest, requests from other initiators are not forwarded to SATA drive 1. Instead, all subsequent I/O commands to SATA drive 1 go through the crossbar switch 624 to a free FAST engine 608 for processing. The FAST engine 608 then sends a command to the shared context engine 622, inquiring whether the target drive is available. If the shared context engine 622 indicates that the drive is not available (e.g. it is currently affiliated with another initiator such as CPU port 610), the FAST engine 608 sends a command to the shared context engine to store the I/O command in a queue 632 located in RAM 614, up to a maximum of 32 commands in one embodiment. If all queue locations become filled, the FAST engine 608 returns a "busy" indication to the initiator(s).

This buffering will cause latency (e.g. on the order of hundreds of milliseconds) in the processing of the queued commands from the other initiators. Note that the delay cannot be too long, otherwise the other initiators may timeout, thinking that the target drive is malfunctioning and start a recovery mechanism. The delay causes an increase in response times for the other initiators, which is generally undesirable. This degraded performance creates back pressure on system administrators to not keep on-line data on the SATA drive, or more generally, not utilize the SATA drive in a manner for which it was not intended.

When a programmable time period elapses, the firmware 630 causes the affiliation to be closed, and as a result, SATA drive 1 is no longer busy. When the shared context engine 622 determines that the drive is no longer busy, it sends a request to the FAST engine 608 to send the next available queued I/O command (control FIS) to the drive. In this manner, all I/O commands from other initiators that have been stored in queue 612 may thereafter be processed, and normal command activity resumes.

Figure 9:
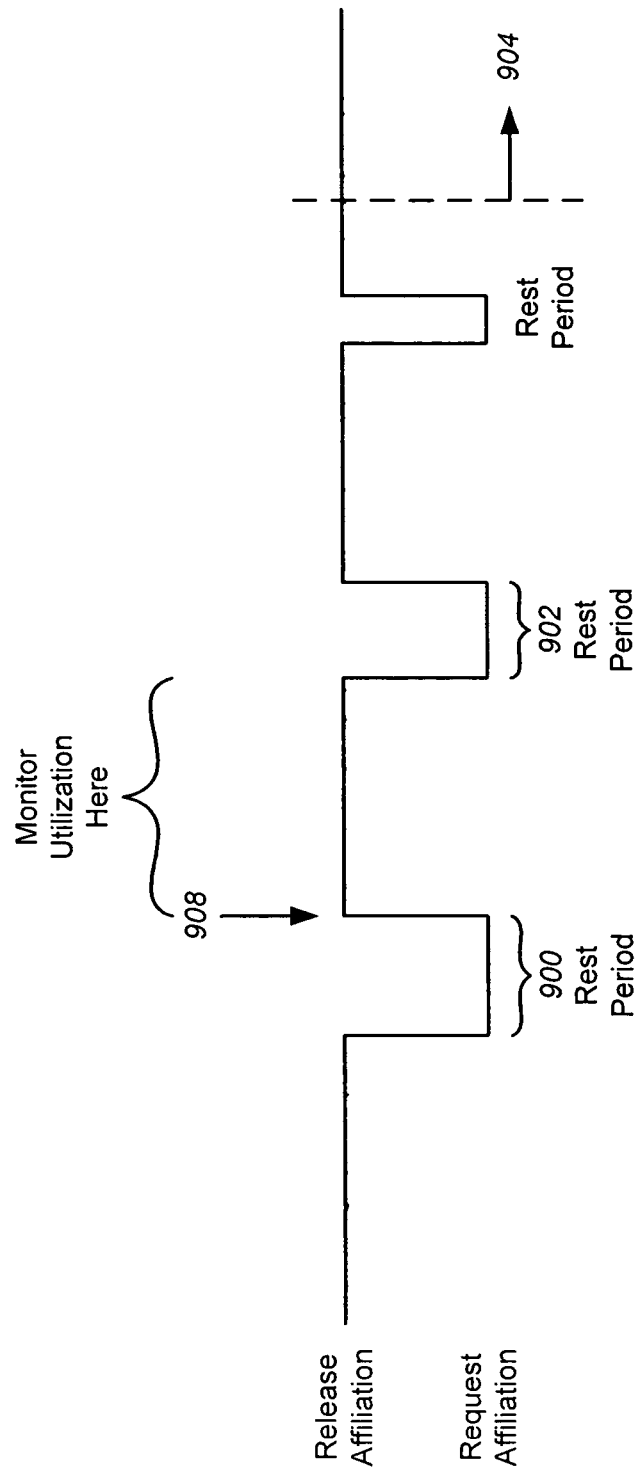
FIG. 9 shows a sequence of affiliations requested and released by firmware according to embodiments of the present invention.

The firmware 630 may request repeated affiliations over time until the usage levels for a particular drive drop back down below the desired utilization thresholds. FIG. 9 shows a sequence of affiliations requested and released by firmware 630 according to embodiments of the present invention. Initially, the firmware being executed by the processor may request an affiliation for a predetermined rest period (e.g. 100 ms, but not long enough so that other initiators believe that the drive has failed) as shown by reference character 900. The firmware 630 may adjust the rest period based on actual utilization data compiled by the drive utilization monitor 628, and/or how long the drive has been exceeding the permissible utilization thresholds. For example, if the actual utilization data shows an extremely high number of IOPS for a very long period of time (as compared to permissible levels), the rest period may be set to a maximum allowable rest period, whereas lesser utilization data may result in a shorter rest period. After the predetermined rest period time has elapsed, the affiliation is released at 908.

At this point, some or all of the buffered commands from other initiators stored in queue 632 are processed, and utilization levels may be re-measured. The re-measured utilization levels may not only consider the data gathered by the drive utilization monitor 628, but may also consider the number of commands that were buffered at the time of affiliation release at 908, which is also an indication of the utilization levels of the drive. If the measured utilization levels are still too high, another affiliation may be requested by the firmware 630 at 902, perhaps for a shorter time if utilization is improving. Note that because the firmware 630 will allow the utilization thresholds to be exceeded for a relatively long period of time to accommodate data backups and other expected instances of heavy burst traffic, the firmware may need to create multiple affiliations for the maximum allowable rest period to bring down utilization levels as fast as permitted. As utilization levels drop closer to permissible levels, the affiliation rest periods will shrink. Eventually, utilization levels may fall below the programmable thresholds at 904, in which case no further affiliations will be requested.

Although the description provided above covers the establishment of an affiliation for one drive to reduce its utilization levels, it should be understood that the firmware 630 and drive utilization monitor 628 can simultaneously monitor and adjust utilization levels for multiple drives.

Embodiments of the present invention may also be implemented within a SATA drive, because SATA drives also have usage monitoring capabilities that store indications of overuse on the SATA drive (used to void warranties when usage is too high), and have queues for storing buffered commands for that drive. Each SATA drive also has some processing capability. The SATA drives could artificially add in latency by leaving buffered commands in the queue for a longer period of time, creating the same effect as the affiliations described above. Alternatively, an initiator such as HBA 604 in FIG. 6 can create an affiliation and simply send the SATA drive no commands during the time when the affiliation is open, effectively producing the same rest period as the affiliation between the CPU port 610 and the target drive during which no commands are sent. In further alternative embodiments, the device utilization functions implemented in firmware 630 may also be implemented in hardware within the FAST switch 620.

As noted above, although embodiments of the present invention are generally described and illustrated herein with respect to SATA devices, and in particular, SATA disk drives and the SATA affiliation mechanism, it should be understood that embodiments of the present invention are generally applicable to other types of devices and protocols such as FC devices, SAS/SATA systems and the STP, and iSCSI, and their corresponding target reservation mechanisms.

For example, FC devices have a "persistent reserve" and "persistent release" feature for single-initiator use that is similar to the concept of affiliations in SATA. Because initiators do not know what other initiators are doing, the persistent reserve and persistent release feature reserves a volume to a particular initiator so that when that initiator is writing to the volume, for example, another initiator will not write to that same volume at the same time. iSCSI devices also use the same "persistent reserve" and "persistent release" commands to reserve a device to solve the same problem. These commands will work with all SCSI devices—FC, SAS and iSCSI all support these commands. This invention is also applicable to SAS/ SATA SANs and the STP as described above, using the same affiliation mechanism described above to reduce utilization levels.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a multi-initiator system, a method of controlling accesses to a target device, comprising:
    monitoring utilization of the target device; and
    in response to detecting overuse of the target device, adjusting access to the target device by:
        identifying a threshold period of time after which an incoming request directed to the target device will time out;
        selecting a delay period that is less than the threshold period of time;
        affiliating the target device with an initiator that did not originate the incoming request and that will remain idle for the delay period, thereby forcing the target device into an idle state that stalls processing of the incoming request for the delay period; and
        removing the affiliation after the delay period, thereby enabling the target device to service the request at an increased latency corresponding to the delay period before the request times out.

2. The method of claim 1, further comprising varying the delay period based on a degree of detected overuse.

3. The method of claim 1, further comprising monitoring accesses to the target device to determine if the utilization of the target device constitutes overuse.

4. The method of claim 1, further comprising allowing pending queueable commands for the target device to complete prior to affiliating the target device.

5. The method of claim 1, further comprising:
buffering commands directed to the target device that are received while the target device is affiliated with the initiator; and
processing the buffered commands after the affiliation is removed.

6. The method of claim 1, further comprising setting an overuse threshold and a permissible duration for which the target device may be overused before adjusting access to the target device.

7. The method of claim 1, further comprising defining different overuse thresholds for different target device types or individual target devices.

8. The method of claim 1, further comprising repetitively adjusting access to the target device until the target device is no longer overused.

9. The method of claim 1, further comprising remeasuring target device utilization after each time access to the target device is adjusted.

10. The method of claim 9, wherein measuring utilization comprises acquiring a count of pending queueable commands for the target device, and remeasuring target device utilization includes counting a number of pending queueable commands after access to the target device has been adjusted.

11. The method of claim 1, wherein the delay period is less than one second.

12. The method of claim 1, wherein when the target device is a SATA device.

13. The method of claim 1, wherein when the target device is a Fibre Channel device, and affiliating the target device comprises utilizing a persistent reserve command.

14. The method of claim 1, wherein when the target device is an iSCSI device, and affiliating the target device comprises utilizing a persistent reserve command.

15. In a multi-initiator system, a processor programmed for controlling accesses to a target device by performing the steps of:
monitoring utilization of the target device; and
in response to detecting overuse of the target device, adjusting access to the target device by:
identifying a threshold period of time after which an incoming request directed to the target device will time out;
selecting a delay period that is less than the threshold period of time;
affiliating the target device with an initiator that did not originate the incoming request and that will remain idle for the delay period, thereby forcing the target device into an idle state that stalls processing of the incoming request for the delay period; and
removing the affiliation after the delay period, thereby enabling the target device to service the request at an increased latency corresponding to the delay period before the request times out.

16. The processor as recited in claim 15, further programmed for varying the delay period based on a degree of detected overuse.

17. The processor as recited in claim 15, further programmed for monitoring accesses to the target device to determine if the utilization of the target device constitutes overuse.

18. The processor as recited in claim 15, further programmed for allowing any pending queueable commands for the target device to complete prior to affiliating the target device.

19. The processor as recited in claim 15, further programmed for:
buffering commands directed to the target device that are received while the target device is affiliated with the initiator; and
processing the buffered commands after the affiliation is removed.

20. The processor as recited in claim 15, further programmed for setting an overuse threshold and a permissible duration for which the target device may be overused before adjusting access to the target device.

21. The processor as recited in claim 15, further programmed for defining different overuse thresholds for different target device types or individual target devices.

22. The processor as recited in claim 15, further programmed for repetitively adjusting access to the target device until the target device is no longer overused.

23. The processor as recited in claim 15, further programmed for remeasuring target device utilization after each time access to the target device is adjusted.

24. The processor as recited in claim 23, wherein measuring utilization comprises acquiring a count of pending queueable commands, and remeasuring target device utilization includes counting a number of pending queueable commands after access to the target device has been adjusted.

25. The processor as recited in claim 15, wherein the delay period is less than one second.

26. The processor as recited in claim 15, wherein when the target device is a SATA device.

27. The processor as recited in claim 15, wherein when the target device is a Fibre Channel device, and affiliating the target device comprises utilizing a persistent reserve command.

28. The processor as recited in claim 15, wherein when the target device is an iSCSI device, and affiliating the target device comprises utilizing a persistent reserve command.

29. A switch comprising the processor recited in claim 15.

30. A disk drive enclosure comprising the switch recited in claim 29.

31. A Storage Area Network (SAN) comprising the disk drive enclosure recited in claim 30.

32. One or more non-transitory storage media including a computer program which, when executed by a processor in a multiinitiator system, controls access to a target device by causing the processor to perform the steps of:
monitoring utilization of the target device; and
in response to detecting overuse of the target device, adjusting access to the target device by:
identifying a threshold period of time after which an incoming request directed to the target device will time out;
selecting a delay period that is less than the threshold period of time;
affiliating the target device with an initiator that did not originate the incoming request and that will remain idle for the delay period, thereby forcing the target device into an idle state that stalls processing of the incoming request for the delay period; and
removing the affiliation after the delay period, thereby enabling the target device to service the request at an increased latency corresponding to the delay period before the request times out.

33. The one or more non-transitory storage media as recited in claim 32, wherein the computer program, when executed by the processor, further causes the processor to perform the step of varying the delay period based on a degree of detected overuse.

34. The one or more non-transitory storage media as recited in claim 32, wherein the computer program, when executed by the processor, further causes the processor to perform the step of monitoring accesses to the target device to determine if the utilization of the target device constitutes overuse.

35. The one or more non-transitory storage media as recited in claim 32, wherein the computer program, when executed by the processor, further causes the processor to perform the step of allowing any pending queueable commands for the target device to complete prior to affiliating the target device.

36. The one or more non-transitory storage media as recited in claim 32, wherein the computer program, when executed by the processor, further causes the processor to perform the steps of:
  buffering commands directed to for the target device that are received while the target device is affiliated with the initiator; and
  processing the buffered commands after the affiliation is removed.

37. The one or more non-transitory storage media as recited in claim 32, wherein the computer program, when executed by the processor, further causes the processor to perform the step of setting an overuse threshold and a permissible duration for which the target device may be overused before adjusting access to the target device.

38. The one or more non-transitory storage media as recited in claim 32, wherein the computer program, when executed by the processor, further causes the processor to perform the step of defining different overuse thresholds for different target device types or individual target devices.

39. The one or more non-transitory storage media as recited in claim 32, wherein the computer program, when executed by the processor, further causes the processor to perform the step of repetitively adjusting access to the target device until the target device is no longer overused.

40. The one or more non-transitory storage media as recited in claim 32, wherein the computer program, when executed by the processor, further causes the processor to perform a step of re-measuring target device utilization after each time access to the target device is adjusted.

41. The one or more non-transitory storage media as recited in claim 40, wherein measuring utilization comprises acquiring a count of pending queueable commands, and remeasuring target device utilization includes counting a number of pending queueable commands after access to the target device has been adjusted.

42. The one or more non-transitory storage media as recited in claim 39, wherein the delay period is less than one second.

43. The one or more non-transitory storage media as recited in claim 32, wherein when the target device is a SATA device.

44. The one or more non-transitory storage media as recited in claim 32, wherein when the target device is a Fibre Channel device, and affiliating the target device comprises utilizing a persistent reserve command.

45. The one or more non-transitory storage media as recited in claim 32, wherein when the target device is an iSCSI device, and affiliating the target device comprises utilizing a persistent reserve command.

46. A switch comprising the processor recited in claim 32.

47. A disk drive enclosure comprising the switch recited in claim 46.

48. A Storage Area Network (SAN) comprising the disk drive enclosure recited in claim 47.

49. In a multi-initiator system, a switch for controlling accesses to a target device, comprising:
  monitoring circuitry operable to monitor utilization of the target device; and
  control circuitry operable to, in response to detecting overuse of the target device, adjust access to the target device by:
  identifying a threshold period of time after which an incoming request directed to the target device will time out;
  selecting a delay period that is less than the threshold period of time;
  affiliating the target device with an initiator that did not originate the incoming request and that will remain idle for the delay period, thereby forcing the target device into an idle state that stalls processing of the incoming request for the delay period; and
  removing the affiliation after the delay period, thereby enabling the target device to service the request at an increased latency corresponding to the delay period before the request times out.

* * * * *